United States Patent
Woo et al.

(10) Patent No.: US 8,879,604 B2
(45) Date of Patent: Nov. 4, 2014

(54) EFFICIENT RENDEZVOUS FOR DISTRIBUTED MESSAGES IN FREQUENCY-HOPPING COMMUNICATION NETWORKS

(75) Inventors: Lik Chuen Alec Woo, Union City, CA (US); Jonathan W. Hui, Foster City, CA (US); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 228 days.

(21) Appl. No.: 13/177,132

(22) Filed: Jul. 6, 2011

(65) Prior Publication Data
US 2013/0013806 A1    Jan. 10, 2013

(51) Int. Cl.
| | |
|---|---|
| *H04B 1/713* | (2011.01) |
| *H04H 20/71* | (2008.01) |
| *H04L 12/18* | (2006.01) |
| *H04B 1/7156* | (2011.01) |
| *H04W 72/00* | (2009.01) |
| *H04H 20/59* | (2008.01) |

(52) U.S. Cl.
CPC ........... *H04B 1/7156* (2013.01); *H04W 72/005* (2013.01); *H04L 12/189* (2013.01); *H04H 20/59* (2013.01)
USPC ..... 375/133; 375/E1.033; 370/345; 455/3.01; 709/238

(58) Field of Classification Search
CPC ...... H04B 1/713; H04B 1/7156; H04H 20/59; H04L 12/189; H04W 72/005
USPC .......... 370/310, 336, 429, 445, 345; 375/139, 375/132–135, E1.033; 455/456.1, 525, 455/414.1, 419, 3.01; 709/212, 238, 207; 340/7.43; 717/116; 705/15, 5, 7.18, 705/7.19; 715/733
See application file for complete search history.

(56) References Cited

U.S. PATENT DOCUMENTS

| | | | |
|---|---|---|---|
| 5,617,083 A * | 4/1997 | Schwendeman et al. ..... 340/7.43 |
| 6,169,761 B1 * | 1/2001 | Marcoccia et al. ........... 375/132 |
| 7,330,693 B1 * | 2/2008 | Goss ........................... 455/3.01 |
| 7,408,907 B2 | 8/2008 | Diener |
| 7,424,268 B2 | 9/2008 | Diener et al. |
| 7,634,536 B2 | 12/2009 | Halasz |
| 7,826,463 B2 | 11/2010 | Patel et al. |
| 7,830,878 B2 | 11/2010 | Furukawa |
| 7,899,027 B2 | 3/2011 | Castagnoli et al. |
| 7,925,778 B1 | 4/2011 | Wijnands et al. |
| 7,953,027 B2 | 5/2011 | Previdi et al. |
| 7,969,981 B2 | 6/2011 | Asati et al. |
| 8,570,911 B2 * | 10/2013 | Song et al. ................... 370/270 |
| 2004/0088362 A1* | 5/2004 | Curbow et al. ............... 709/207 |

(Continued)

*Primary Examiner* — Wing F Chan
*Assistant Examiner* — Raji Krishnan
(74) *Attorney, Agent, or Firm* — Edwards Wildman Palmer LLP; James M. Behmke; Stephen D. LeBarron

(57) ABSTRACT

In one embodiment, a rendezvous request message is generated (e.g., by a sender) that specifies a channel C and a rendezvous time T for which a distributed message is to be transmitted in a frequency-hopping computer network. The rendezvous request message is then transmitted on one or more channels used in the computer network based on reaching a plurality of intended recipients of the distributed message with the rendezvous request message prior to rendezvous time T. Accordingly, the distributed message is then transmitted on channel C at rendezvous time T. In another embodiment, a device receives a rendezvous request message, and in response to determining to honor the rendezvous request message, listens for the distributed message on channel C at rendezvous time T.

23 Claims, 16 Drawing Sheets

(56) References Cited

U.S. PATENT DOCUMENTS

| | | | |
|---|---|---|---|
| 2004/0125811 A1* | 7/2004 | Raad et al. | 370/400 |
| 2004/0157637 A1* | 8/2004 | Steer et al. | 455/525 |
| 2006/0242025 A1* | 10/2006 | Nishihara et al. | 705/15 |
| 2008/0259895 A1* | 10/2008 | Habetha et al. | 370/345 |
| 2008/0285628 A1* | 11/2008 | Gizis et al. | 375/135 |
| 2009/0060002 A1* | 3/2009 | Schmit et al. | 375/134 |
| 2010/0005448 A1* | 1/2010 | DelloStritto et al. | 717/116 |
| 2010/0022225 A1* | 1/2010 | Benger et al. | 455/414.1 |
| 2010/0177718 A1* | 7/2010 | Harle et al. | 370/329 |
| 2011/0032912 A1* | 2/2011 | Cordeiro et al. | 370/336 |
| 2011/0075704 A1* | 3/2011 | Bettendorff et al. | 375/133 |
| 2012/0155511 A1* | 6/2012 | Shaffer et al. | 375/133 |
| 2012/0230370 A1* | 9/2012 | Shaffer et al. | 375/133 |

* cited by examiner

EFFICIENT RENDEZVOUS FOR DISTRIBUTED MESSAGES IN FREQUENCY-HOPPING COMMUNICATION NETWORKS

TECHNICAL FIELD

The present disclosure relates generally to wireless communication, and, more particularly, to distributed messages (e.g., broadcast and/or multicast) in frequency-hopping communication networks.

BACKGROUND

In a frequency-hopping network, devices communicate using different frequency channels at different times. To communicate a packet, the transmitter and receiver must be configured to the same channel during the packet transmission. Devices may synchronize to a hopping schedule that indicates what channel to use at a specific point in time. A hopping schedule typically divides time into timeslots, with each timeslot assigned a channel. The time-ordered sequence of channels in a hopping schedule is called the channel sequence. For two or more devices to synchronize to a hopping schedule, they must agree on the channel sequence, timeslot duration, and a common time base. Generally, channel schedules may be assigned to each transmitter-receiver pair independently so that neighboring transmitter-receiver pairs can communicate simultaneously on different channels. Alternatively, all devices in a network may synchronize with a single channel schedule such that all devices transmit and receive on a shared channel at any time.

Transmitting distributed messages, e.g., broadcast and/or multicast messages, in frequency-hopping networks is especially challenging. One option used currently is to transmit the distributed messages during a timeslot where multiple receivers are scheduled to listen on the same channel at the same time. However, nodes must maintain close synchronization with the transmitter and involves significant state complexity and state synchronization dependencies. Alternatively, a node may make repeated transmissions to each of its neighbors on the respective (and independently scheduled) channels. This overhead scales linearly with the number of receivers (or neighbors for broadcast), which may be particularly problematic since in certain networks, nodes can have hundreds or thousands of neighbors.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
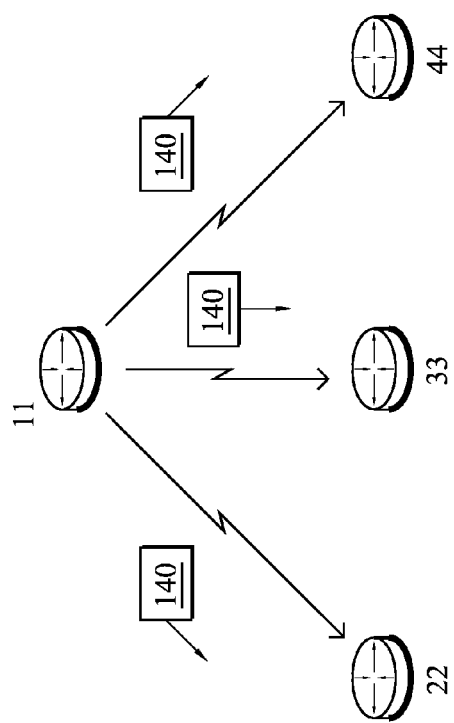
FIG. 1 illustrates an example computer network.
Figure 1:
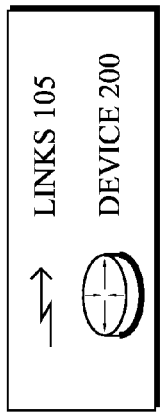

According to one or more embodiments of the disclosure, a rendezvous request message is generated (e.g., by a sender) that specifies a channel C and a rendezvous time T for which a distributed message is to be transmitted in a frequency-hopping computer network. The rendezvous request message is then transmitted on one or more channels used in the computer network based on reaching a plurality of intended recipients of the distributed message with the rendezvous request message prior to rendezvous time T. Accordingly, the distributed message is then transmitted on channel C at rendezvous time T. According to one or more additional embodiments of the disclosure, a device receives a rendezvous request message, and in response to determining to honor the rendezvous request message, listens for the distributed message on channel C at rendezvous time T.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

A wireless network, in particular, is a type of shared media network where a plurality of nodes communicate over a wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities" (e.g., for Advanced Metering Infrastructure or "AMI" applications) and may often consist of wireless nodes in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example computer network 100 (e.g., wireless or otherwise) illustratively comprising nodes/devices 200 (e.g., labeled as shown, "11," "22," "33," and "44") interconnected by frequency-hopping communication links 105, as described below. In particular, certain nodes 200, such as, e.g., routers, sensors, computers, radios, etc., may be in communication with other nodes 200, e.g., based on distance, signal strength, current operational status, location, etc. Those skilled in the art will understand that any number of nodes, devices, links, etc. may be used in the wireless network, and that the view shown herein is for simplicity (particularly, that while routers are shown, any wireless communication devices 11-44 may be utilized). Also, while the embodiments are shown herein with reference to a generally wireless network, the description herein is not so limited, and may be applied to networks that have wired links, wireless links, PLC links, etc.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate (e.g., PLC). As described herein, the communication may be based on a frequency-hopping protocol. In this context, a protocol consists of a set of rules defining how the nodes interact with each other.

Figure 2:
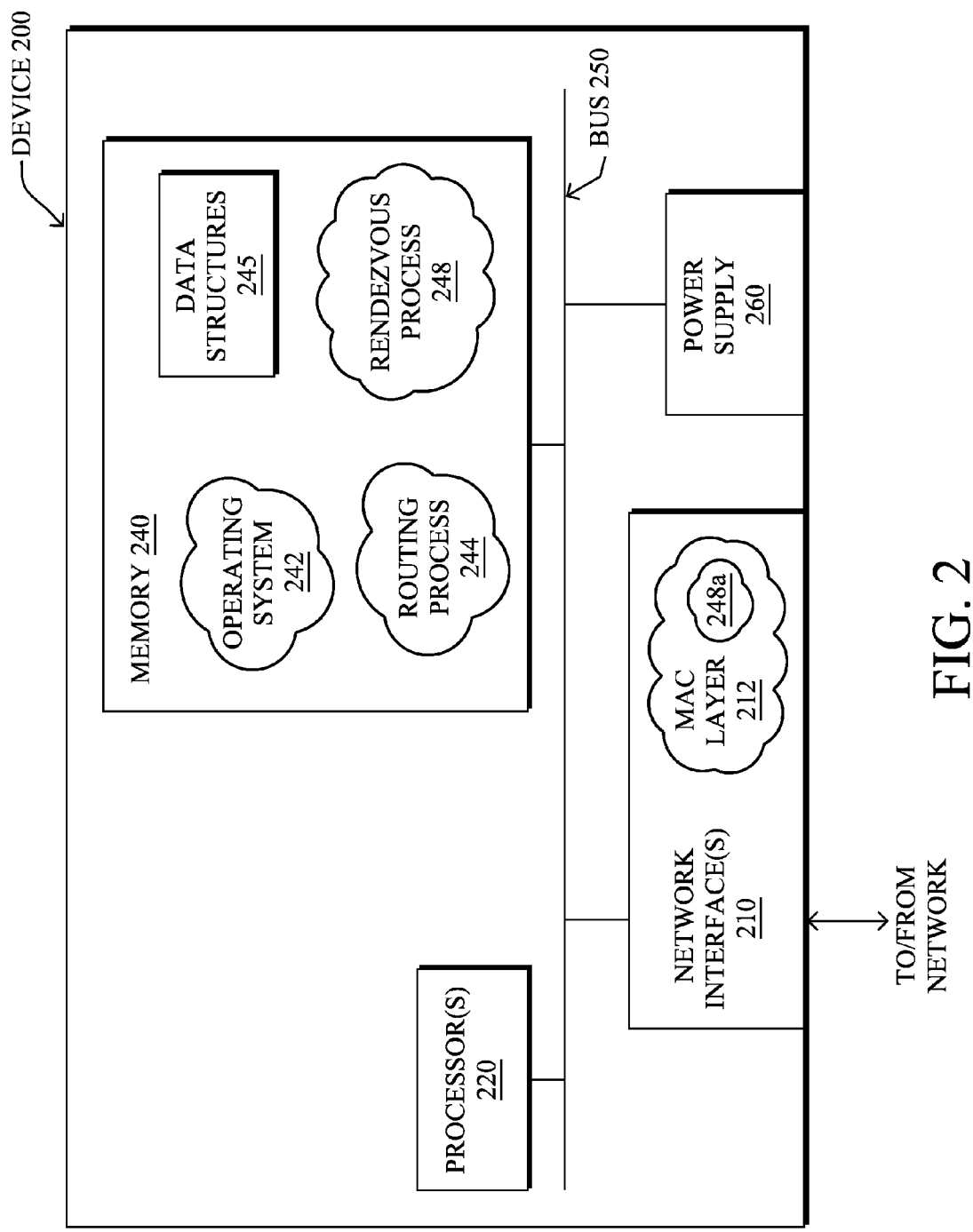
FIG. 2 illustrates an example device/node.

FIG. 2 is a schematic block diagram of an example node/device 200 that may be used with one or more embodiments described herein, e.g., as nodes 11-44. The device may comprise one or more network interfaces 210 (e.g., wireless/frequency-hopping), at least one processor 220, and a memory 240 interconnected by a system bus 250, as well as a power supply 260 (e.g., battery, plug-in, etc.).

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art, particularly for frequency-hopping communication as described herein. In addition, the interfaces 210 may comprise an illustrative media access control (MAC) layer module 212 (and other layers, such as the physical or "PHY" layer, as will be understood by those skilled in the art). Note, further, that the nodes may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "rendezvous process" 248 as described in greater detail below. Note that while rendezvous process 248 is shown in centralized memory 240, alternative embodiments provide for rendezvous process to be specifically operated within the network interfaces 210, such as a component of MAC layer 212 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Frequency-hopping, also referred to as "frequency-hopping spread spectrum" (FHSS) or channel-hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 3:
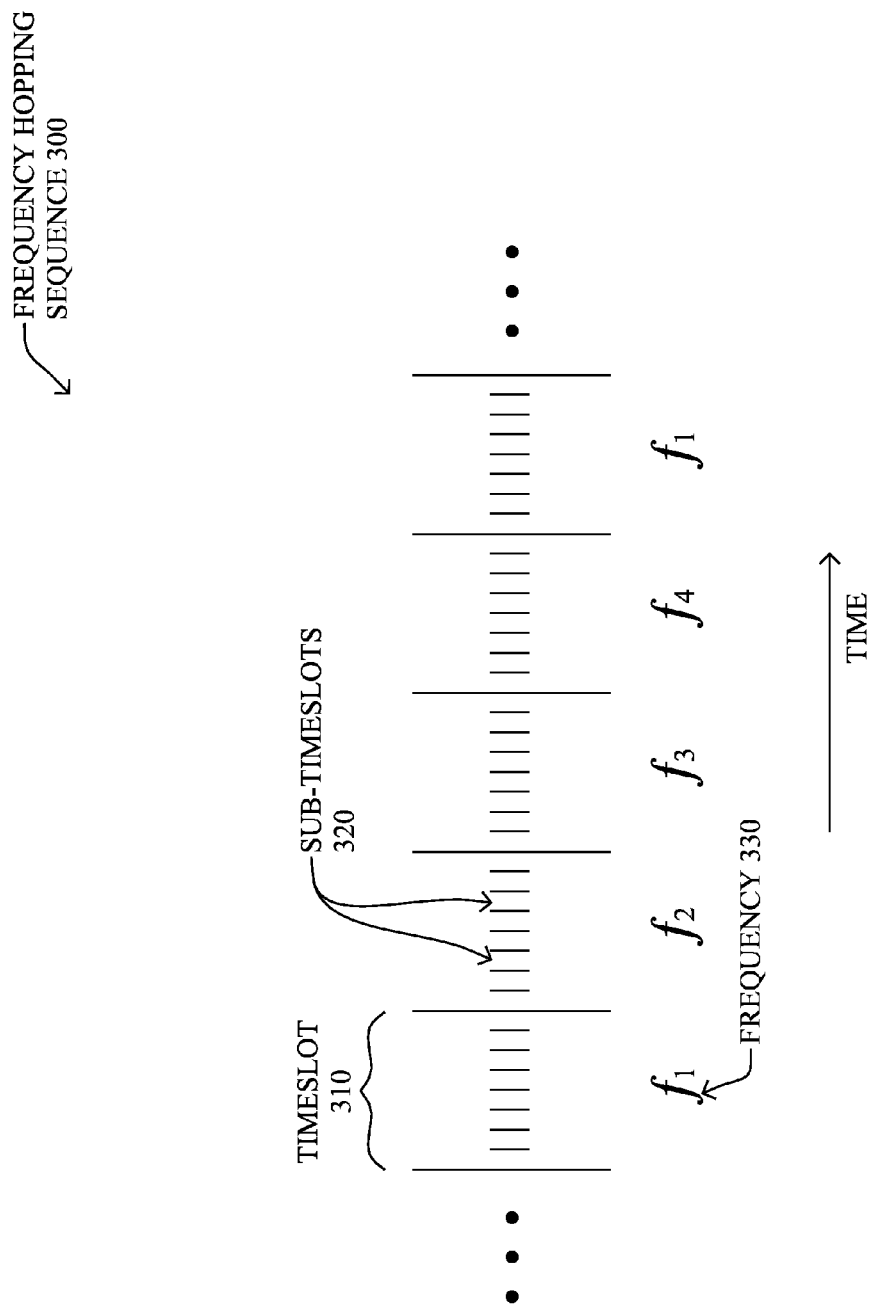
FIG. 3 illustrates an example frequency-hopping sequence.

In particular, as shown in FIG. 3, in frequency-hopping wireless networks, time frames are divided within a frequency-hopping sequence 300 into regular timeslots 310, each one operating on a different frequency 330 (e.g., $f_1$-$f_4$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 310 may be further divided into sub-timeslots 320. (Note that not all frequency-hopping systems use sub-timeslots, and devices can begin transmission at any time within a timeslot; the view herein is merely one example.) Illustratively, the MAC layer 212 is in charge of scheduling the timeslot in which a packet is sent, the main objective of which generally being randomization of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

Figure 4A:
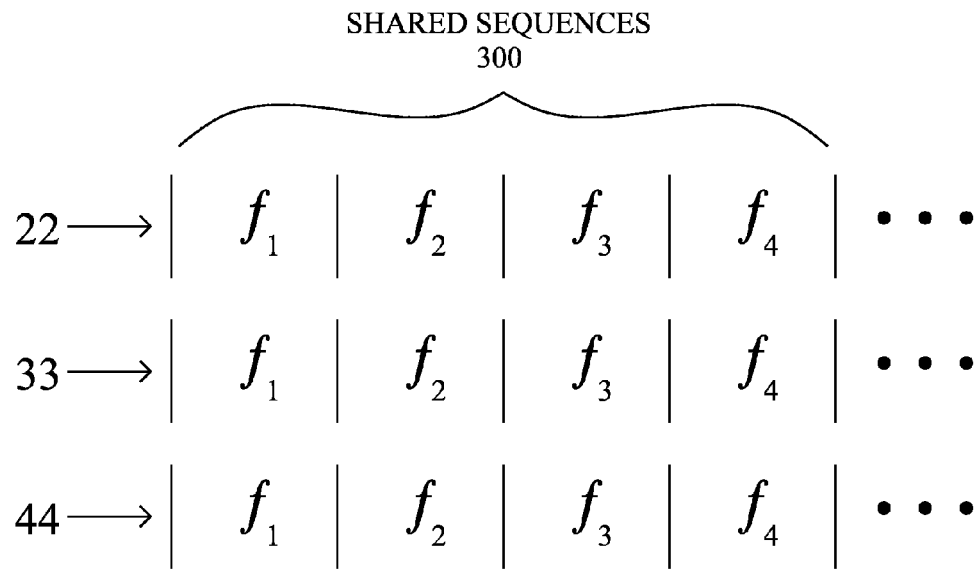
FIGS. 4A-4B illustrate further example frequency-hopping sequences.
Figure 4B:
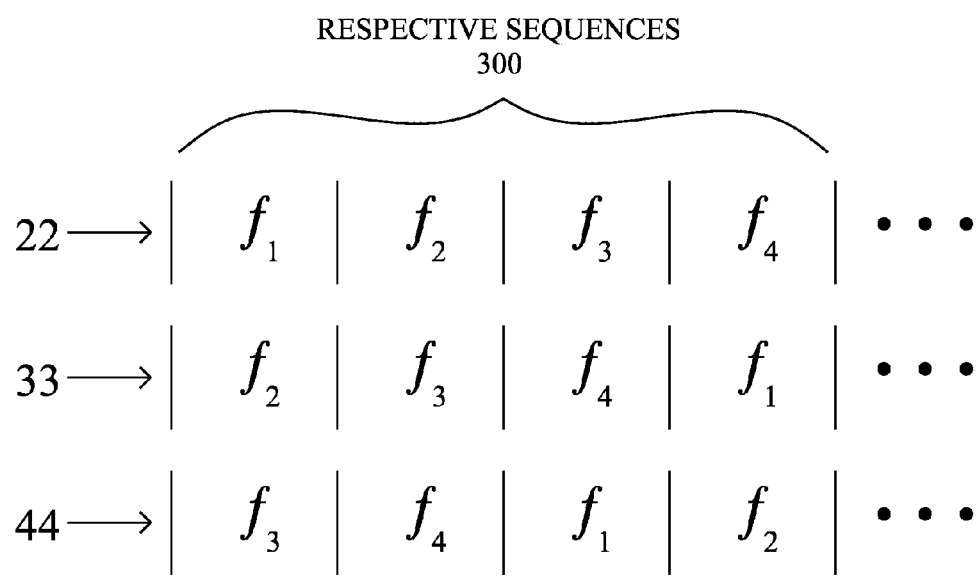

A device in the frequency-hopping network configures its receiver to follow a hopping schedule by picking a channel sequence, duration of each time slot, and time base that defines when the first slot in the schedule begins. To then communicate a packet, the transmitter and receiver must be configured to the same channel during the packet transmission. All devices in a given network may utilize the same hopping schedule (i.e. all devices are configured to use the same channel sequence, time slot duration, and a common time base), resulting in a network where all communication in the network at any given point in time utilizes the same channel. An example of this is shown in FIG. 4A, in which each receiver (22, 33, and 44) are all configured with the same sequence (assume also that node 11 uses the same sequence). Alternatively, each transmitter-receiver pair may utilize different hopping schedules (i.e., each pair may differ in channel sequence, time slot duration, and/or time base), such that transmitter-receiver pairs may communicate at the same time but on different channels. For instance, each device in the channel hopping network may individually pick their own hopping schedule parameters independent of any other node, as is shown in FIG. 4B. Note that the offset of the frequencies (i.e., the fact that the same four frequencies are used in the same order, just offset by one timeslot) is merely one illustration, and the sequences and frequencies can be independently chosen. Also, note that while timeslots are shown as being synchronized between different nodes, those skilled in the art will appreciate that timeslots between different nodes can, in fact, be out-of-phase, and may have no relationship with each other.

A device synchronizes its hopping schedule with another device by communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

As noted above, transmitting distributed messages, e.g., broadcast and/or multicast messages, in frequency-hopping networks is especially challenging. One option used currently is to transmit the distributed messages during a timeslot where multiple receivers are scheduled to listen on the same channel at the same time. This is extremely efficient in channel utilization, as only a single transmission of the distributed message is required. However, nodes must maintain close synchronization with the transmitter. In a multi-hop network, nodes must synchronize to a broadcast schedule with each of their neighbors or the entire network must maintain global synchronization. The former can require significant state complexity especially in dense networks, while the latter places state synchronization dependencies across all nodes in the network. Global state dependencies are not desirable because they make the network less robust and more vulnerable to attack. Alternatively, a node may make repeated transmissions to each of its neighbors on the respective (and independently scheduled) channels. This overhead scales linearly with the number of nodes/neighbors, which may be particularly problematic since in certain networks (e.g., urban Smart Grid environments), nodes can have hundreds or thousands of neighbors.

In particular, large-scale mesh networks are an important component of AMI networks or Urban networks, and distributed messages such as broadcast and/or multicast messages are an important communication primitive in such networks. For instance, being address-free, broadcast messages are often used to discover neighboring devices. Broadcast and/or multicast, depending on how it is implemented, can also be significantly more efficient when communicating a single message to multiple nodes. In the best case, a distributed message only requires a single transmission to reach an unlimited number of neighboring nodes. In addition, an important traffic pattern in many AMI applications is delivering a set of messages from a central server to a large number of devices on the order of a few minutes or less. In large-scale mesh networks, this is most often implemented as a simple flood where all nodes are responsible for retransmitting the received message in attempt to forward it along to other nodes. However, doing so efficiently is challenging especially in a frequency-hopping packet network.

Current frequency-hopping network protocols are capable of scheduling broadcast slots between a transmitter and one or more receivers, but such protocols rely on global time synchronization and the schedules are computed by a central gateway. As a result, this implementation is not robust to failures in global time synchronization or the gateway itself. This mechanism also does not allow nodes to efficiently broadcast without being in range of existing infrastructure. Other protocols schedule all nodes to receive on the same channel at the same time: the entire network hops together in lock-step. While this network is optimized for broadcast, it does not allow frequency diversity for unicast transmissions where different pairs of nodes may communicate at the same time on different channels. Further, both of these approaches rely on network-wide time synchronization, which can be problematic in large-scale networks. Typically, a single node must be chosen as the root time server. The network must gracefully handle issues related to partitions and merges. Moreover, faulty or compromised nodes can skew time in portions of the network, causing the time synchronization to fail.

Efficient Distributed Message Rendezvous

The techniques herein provide for efficient transmission of distributed messages (e.g., broadcast/multicast) in a frequency-hopping network where each transmitter-receiver pair operates using independent channel schedules. In particular, the techniques herein efficiently schedule neighboring nodes to receive on the same channel at the same time to minimize channel utilization when broadcasting data packets, and does so while requiring minimal state and no network-wide synchronization or dependencies.

Specifically, according to one or more embodiments of the disclosure as described in detail below, a rendezvous request message is generated (e.g., by a sender) that specifies a channel C and a rendezvous time T for which a distributed message is to be transmitted in a frequency-hopping computer network. The rendezvous request message is then transmitted on one or more channels used in the computer network based on reaching a plurality of intended recipients of the distributed message with the rendezvous request message prior to rendezvous time T. Accordingly, the distributed message is then transmitted on channel C at rendezvous time T. Also, a device receiving the rendezvous request message, if honoring the request, listens for the distributed message on channel C at rendezvous time T.

Illustratively, the techniques described herein may be performed by hardware, software, and/or firmware, such as in accordance with rendezvous process 248 and/or MAC layer module 212 (e.g., rendezvous process 248a), which may contain computer executable instructions executed by a processor (e.g., processor 220 or an independent processor within the network interface 210) to perform functions relating to the novel techniques described herein, such as, e.g., as part of a frequency-hopping communication protocol. For example, the techniques herein may be treated as extensions to conventional wireless communication protocols, such as the IEEE 802.11 protocol, IEEE 802.15.4e protocol, WiFi, etc., and as such, would be processed by similar components understood in the art that execute such protocols, accordingly.

Note also that while the description herein references both broadcast messages and multicast messages as "distributed messages," certain aspects of the embodiments herein may apply only to broadcast messages or only to multicast messages, such as where specifically indicated herein or else as would be understood by those skilled in the art. Generally, a broadcast message is transmitted to all reachable recipients in the computer network, while a multicast messages is transmitted to a select sub-set of reachable intended recipients. "Distributed messages," then, refer to any message to which the techniques herein may be similarly applied to both broadcast messages and multicast messages, regardless of the intended recipients.

Operationally, prior to transmitting a distributed message, a series of short control packets, called rendezvous request messages (or, alternatively, Request to Broadcast or "RtB" messages), may be sent across all (necessary) channels to a set of frequency-hopping receivers. At a minimum, the rendezvous request message contains a rendezvous time and channel information at which the sender will transmit a distribute message in the future. Receivers may then listen to that channel at or before that time to receive the distributed message. Note that the rendezvous request messages are generally very short messages, and are much more efficient than sending the (larger) broadcast message across all channels to reach independently hopping-sequenced receivers. The rendezvous request messages are also much more robust, since shorter packets are less likely to be affected by random interference and bit-errors than a larger broadcast message.

Figure 5:
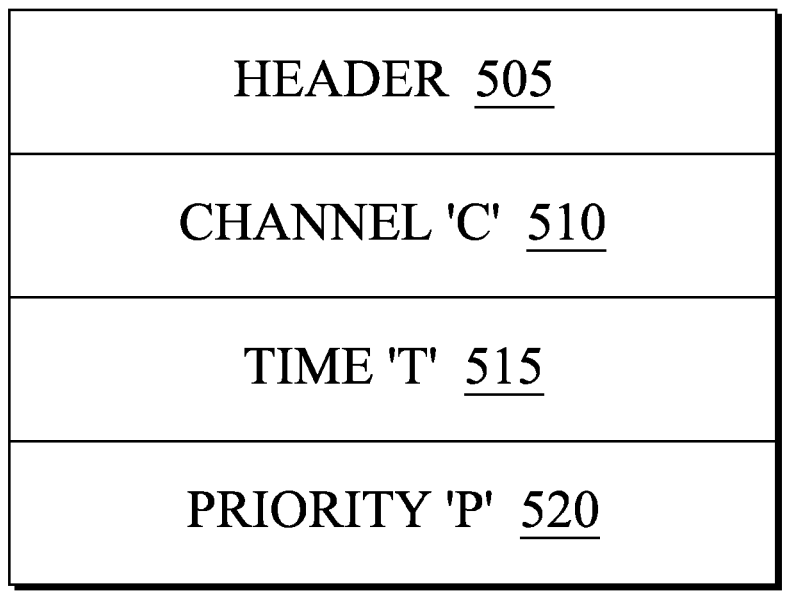
FIG. 5 illustrates an example rendezvous request message.

FIG. 5 illustrates an example rendezvous request message 500 that may be generated, e.g., as a MAC-layer control packet. The message 500 may contain a header 505 suitable for transmission according to the underlying protocol (e.g., preambles, source addresses, destination addresses, packet types, error check codes, etc.), and need only be sufficiently informative for a receiving device to decipher the packet's intent. In particular, the rendezvous request message specifies a channel C (field 510) and a rendezvous time T (field 515) for which a distributed message is to be transmitted. The rendezvous time T may be either a specified time (e.g., shared within the network 100) or a delay length (timer) until the distributed message is to be transmitted. For example, in choosing T (and C), the transmitter can attempt to maximize the number of neighbors that will already be on the same channel at time T. A priority field 520 may also optionally be included, the use of which described below. The message 500 may generally be kept as short as possible (e.g., much shorter than a sub-timeslot 320, as doing so reduces channel utilization for such control packets and the possibility of corrupting other transmissions already in progress, and increases reliability of transmitting the messages, as well.

The sender of the distributed message, e.g., node 11, may then transmit the rendezvous request message 500 into the network 100 according to the embodiments as described herein. Specifically, the rendezvous request message 500 may be transmitted on one or more channels used in the computer network 100 based on reaching a plurality of intended recipients of the distributed message with the rendezvous request message prior to rendezvous time T.

Figure 6A:
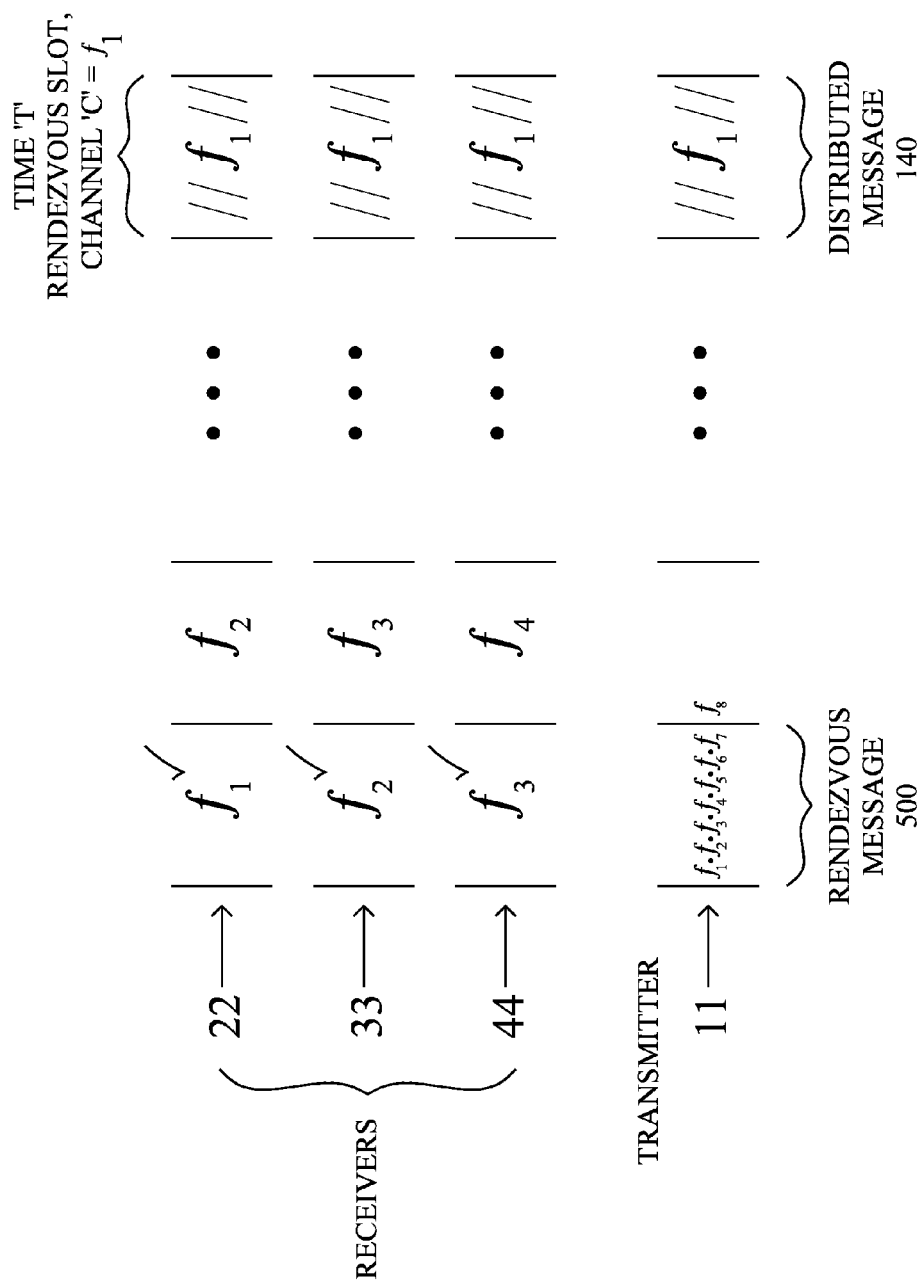
FIGS. 6A-6D illustrate example distributed message rendezvous timing and associated frequency-hopping sequences.

In a first illustrative embodiment, particularly in a network with little contention, the rendezvous request message 500 may be transmitted once on each channel used in the computer network, e.g., back-to-back in time. That is, in this embodiment, the request messages are sent over all channels, e.g., without any carrier sensing. FIG. 6A illustrates an example of this embodiment, where the request message 500 is transmitted on a plurality of channels $f_1$-$f_8$, for instance, all of the channels used in the illustrative network. As shown, each of the receivers 22, 33, and 44 receive the message 500 within the first timeslot, since their respective frequencies $f_1$, $f_2$, and $f_3$, each see a copy of the message within that time. Notably, in the event that there are additional frequencies (e.g., $f_8$) for which a rendezvous message 500 cannot be sent within the first timeslot, then an additional timeslot may be entered.

Note also that while the frequencies on which the message 500 is transmitted are shown in order, one specific embodiment provides for the rendezvous request messages to be sent on a selected order of channels/frequencies. For example, by using a pseudo-random permutation, though using each frequency at least once, it may be possible to avoid the occasion of two closely situated neighbors consistently conflicting in their transmission of rendezvous request messages.

Moreover, forward error correction (FEC) code with large symbol size and block, such as Reed-Solomon (e.g., IEEE 802.15.4g), can be used to recover potential corruption due to rendezvous request messages 500. That is, the system may utilize Forward Error Correction on normal data transmissions to reduce the likelihood that a single rendezvous request message 500 will cause a transmission failure.

Figure 6B:
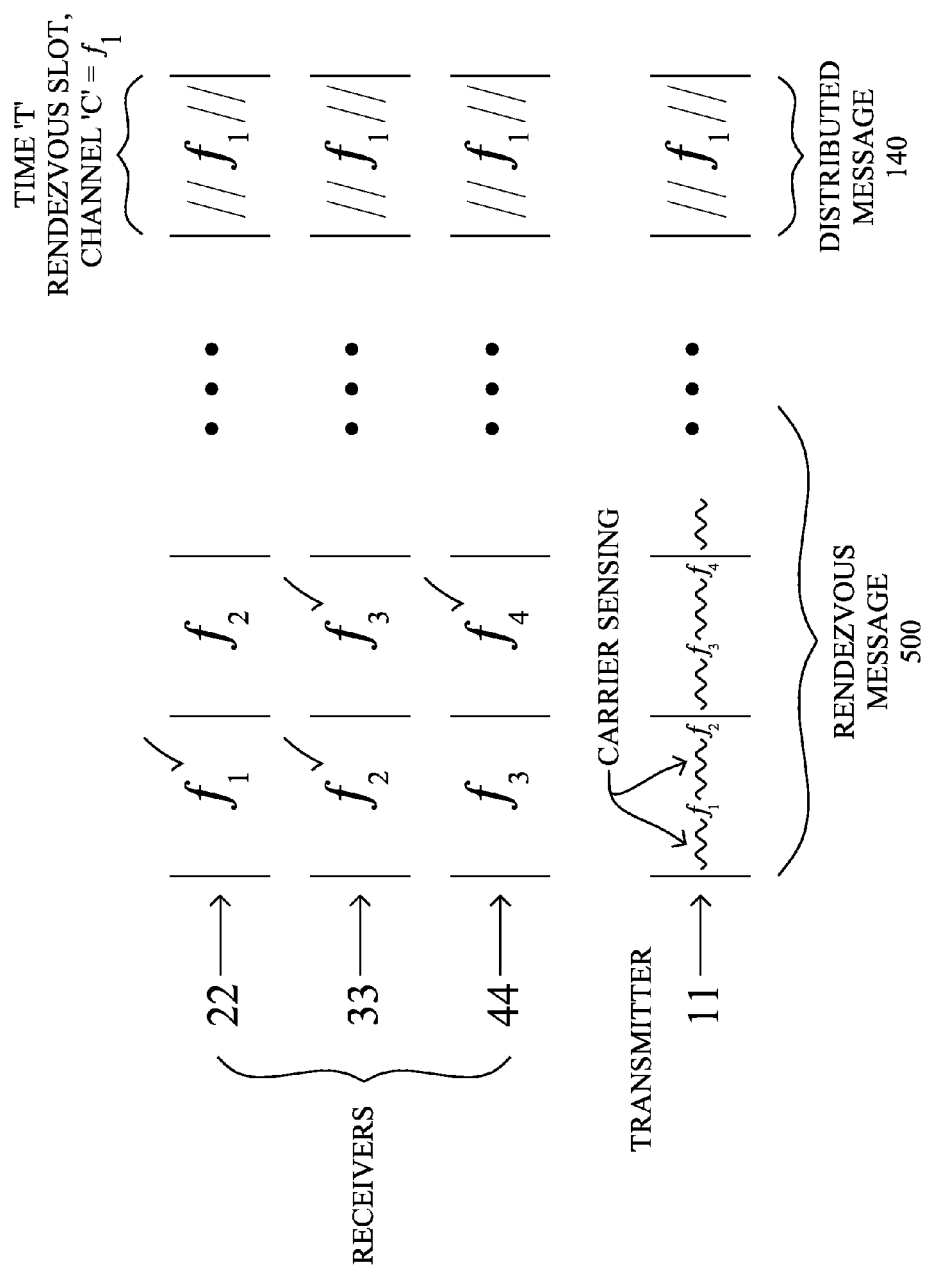

In another illustrative embodiment, with reference to FIG. 6B, carrier sensing may be used. Specifically, in a network with high contention, a carrier sense for each rendezvous request message 500 could be performed, such as where media channel access time and back-off preferences are given to rendezvous request messages over normal traffic. A time bound equal to or smaller than the expected channel acquisition time for messages 500 can be used, and the rendezvous time T may be determined to take this latency into account across all channels. If channel access cannot be acquired within this time bound, the rendezvous request messages may still be sent regardless to meet the scheduled rendezvous time. Note that the carrier sensing shown in FIG. 6B may be exaggerated for illustration, and is not meant to be a scaled representation of latency in this embodiment. Of note, however, the completion time for transmitting a message 500 on all channels will generally be longer than the embodiment above with reference to FIG. 6A.

Figure 6C:
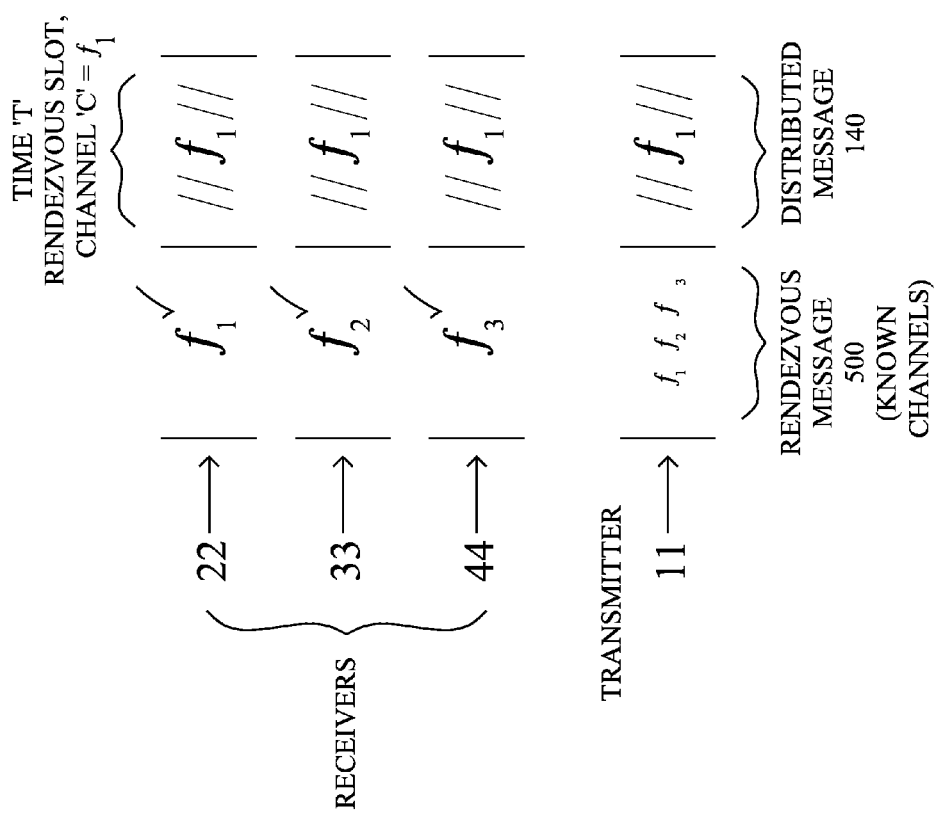

Notably, if the number of channels/frequencies used in a network is large, then the number of request messages 500 required increases. According to one additional embodiment herein, a specific approach may rely on the logical connectivity of the network, such as that represented by a neighbor table within each node (e.g., routing tables, etc., data structures 245). Based on the connectivity, a sending node may determine reachable neighbors, and only needs to send rendezvous request messages 500 to the channels used by those nodes, rather than all channels in the network. For example, as shown in FIG. 6C, assuming the simplified network 100 shown in FIG. 1, assume that node 11 need only reach neighbors 22, 33, and 44. As such, the channels on which the rendezvous message 500 need be transmitted can be limited to corresponding channels $f_1$, $f_2$, and $f_3$ to reach the reachable neighbors. Note that this optimization is generally more suited for sparse networks or small multicast groups than for dense situations.

Figure 6D:
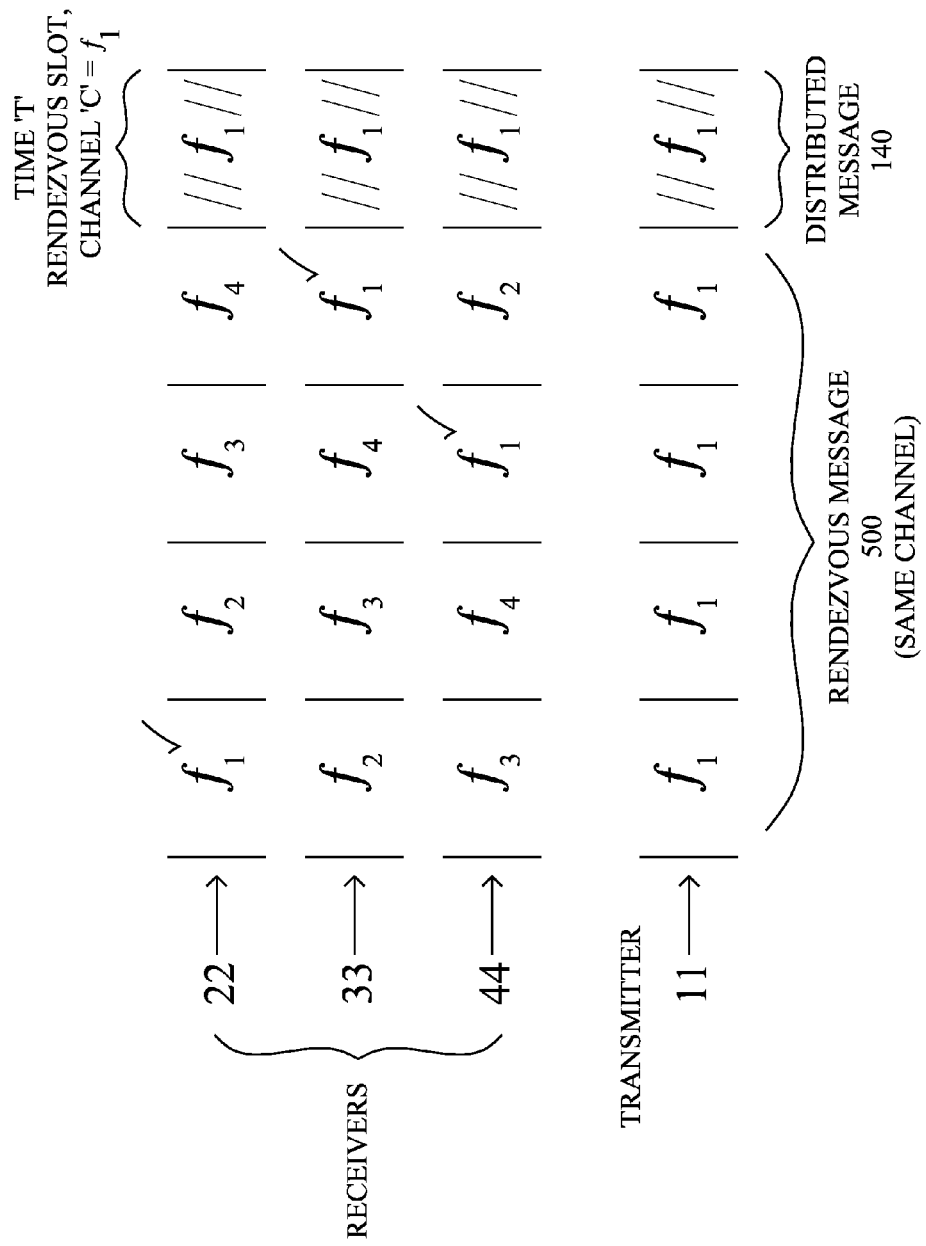

FIG. 6D illustrates still another approach to transmit the rendezvous request message 500 to nodes in the network. In particular, instead of sending rendezvous request messages across all channels, this alternative approach is to send a rendezvous request message on the same channel (e.g., $f_1$) in each hopping sequence timeslot until a round of hopping channels have completed (i.e., until the sequence has restarted). This assumes a property where the hopping sequence is defined by a finite field, such as a Galois field, in which each channel is uniformly used once in the hopping sequence and thus, at the end of the sequence, each receiver should have listened to the rendezvous request message channel once.

This final approach has as an advantage of avoiding a storm of rendezvous request message series colliding by having each receiver randomly pick one of the hopping channels to send out the rendezvous request messages, and does not require rendezvous request messages to be sent back-to-back in time. Accordingly, rendezvous request message collision with data packets can be minimized because carrier sensing and back-off techniques may be utilized, such as by treating rendezvous request messages the same as data packets on the MAC layer. The tradeoff for this final approach in FIG. 6D, however, is an increase in latency as each round of rendezvous request messages is now defined by the time to complete a round of hopping sequences. Generally, this approach is better suited for a dense network, and it may yield a more control and reliable broadcast than the above approaches (e.g., FIG. 6A).

Note that as an additional aspect of the embodiments above that selectively chose channels on which to transmit the rendezvous request message 500 (e.g., FIGS. 6C and 6D, and optionally FIGS. 6A and 6B with added intelligence), it may be possible to maximize channel overlap between the intended recipients for transmitting the rendezvous request message. That is, the selected channels may be chosen in a manner that allows for one transmission on one channel to be heard by multiple neighbors, thus minimizing the number of channels on which the rendezvous request message need be transmitted.

Once the rendezvous request messages have been transmitted as described above, then at the specified rendezvous time T, the transmitter transmits (broadcasts/multicasts) the distributed message (e.g., data packet 140) on channel C. In particular, at that time, any interested receiver having received a rendezvous request message 500 may schedule itself to receive on channel C after the rendezvous time T has elapsed.

Note that a receiver may first determine whether to honor the rendezvous request message 500, prior to listening for the distributed message on channel C at rendezvous time T. That is, the receiver may choose not to accept the schedule if it needs to meet other, e.g., higher priority, tasks that preclude it from satisfying the rendezvous request message schedule. For example, other quality-of-service (QoS) guarantees may involve higher priority transmissions during that time or reception of other higher priority broadcast messages. A receiver may choose to cancel a scheduled rendezvous request message after receiving a higher priority rendezvous request message (e.g., based on priority field 520).

In addition, it is beneficial that the receiver attempt to avoid rendezvous request message transmission and other data transmissions during any known broadcast periods from received rendezvous request messages, i.e., avoiding transmission on channel C at rendezvous time T. However, in some cases, it may be possible that a node has already scheduled its own distributed message transmission, in which case it other parameters (e.g., priority) may determine whether or not to cancel the transmission.

Figure 7A:
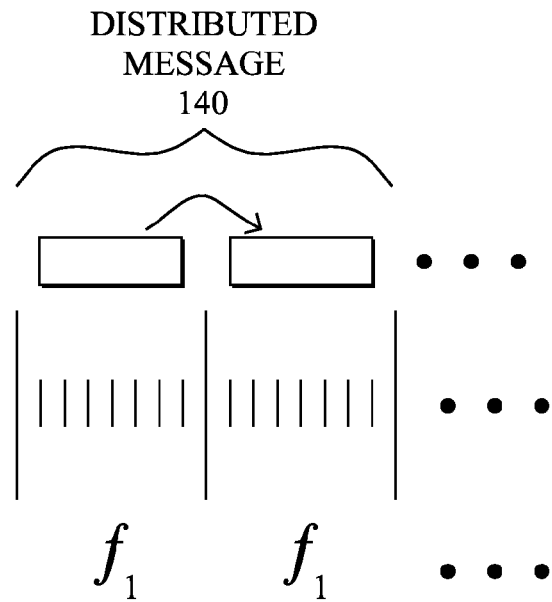
FIGS. 7A-7B illustrate an example distributed message that crosses frame boundaries.

As shown in FIG. 7A, there are times when the distributed message (data packet 140) is larger than what can fit within a single MAC frame. As such, the message must be fragmented across multiple frames. Upon determining that the distributed message extends beyond a single frame, it may be indicated within the distributed message transmission that the distributed message continues to at least a next frame. For example, each fragment can have a "pending" bit that indicates another frame will follow immediately, and the transmitter transmits all fragments back-to-back in order. As shown in FIG. 7A, the fragments may each be sent on the same frequency ($f_1$), and each receiver is configured to remain on the same frequency/channel until completion of the distributed message. Where the fragments are sent on the same frequency, the transmitter generally need not stop transmitting and the receiver need not stop receiving on time-slot boundaries, i.e., the large frame is transmitted on a single channel without fragmentation, and the receiver can continue to receive on the same channel until the end of the packet.

Figure 7B:
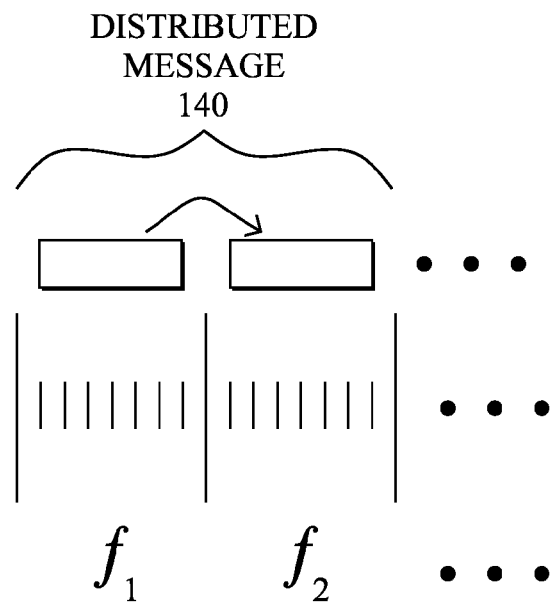

Note that a message that crosses frame boundaries may or may not be transmitted on the same channel. For instance, as shown in FIG. 7B, an alternative arrangement is to have the distributed message continue on a pre-determined or otherwise explicitly indicated hopping sequence. That is, the next channel ($f_2$) may be indicated within an extended header field of the data packet, or else may be a sequential order based on the first rendezvous channel C (e.g., C, C+1, C+2, etc.).

Figure 8A:
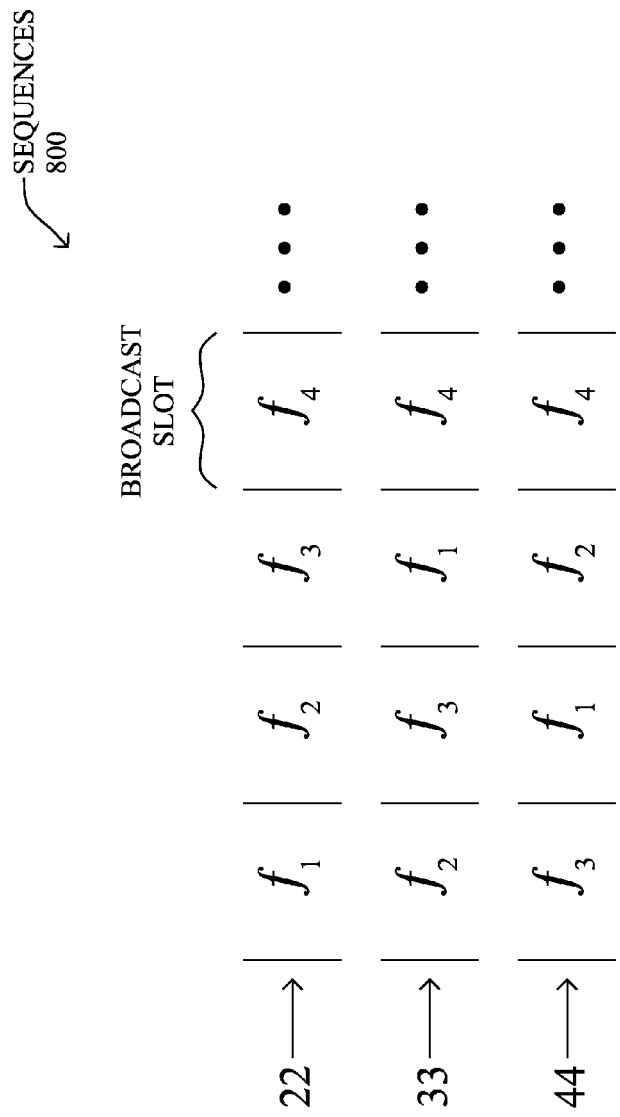
FIGS. 8A-8C illustrate examples of rendezvous timing with respect to broadcast timeslots in a frequency-hopping sequence.

In accordance with an additional embodiment of the disclosure, specific actions may be utilized when sending a distributed message, particularly a multicast distributed message, when the frequency-hopping sequence has one or more dedicated "broadcast slots." For example, as shown in FIG. 8A, a new sequence 800 is shown where each receiver (and presumably the transmitter) shares a particular frequency (A) at a given time (e.g., the broadcast slot). Such slots are often used when a device has a packet destined for multiple neighboring receivers, and is efficient with respect to energy cost and channel utilization. However, it is often desirable to allocate more channel capacity for unicast communication rather than broadcast communication, for example, since traffic profiles for many LLN applications (e.g. Smart Grid AMI) are dominated by unicast traffic flows. As a result, it is useful to minimize use of the broadcast slot whenever possible. Moreover, because the amount of time dedicated to the broadcast schedule in this type of sequence is generally relatively small when compared to the unicast schedule, waiting for a broadcast slot can incur significant communication delays.

According to this additional embodiment, a transmitting device may chose between the techniques described above to use rendezvous request messages that optimize rendezvous request message transmissions based on the unicast schedules of the intended receivers, or else to use the broadcast slot, such as where the broadcast schedule happens to provide lower communication latency than using the rendezvous request messages.

Figure 8B:
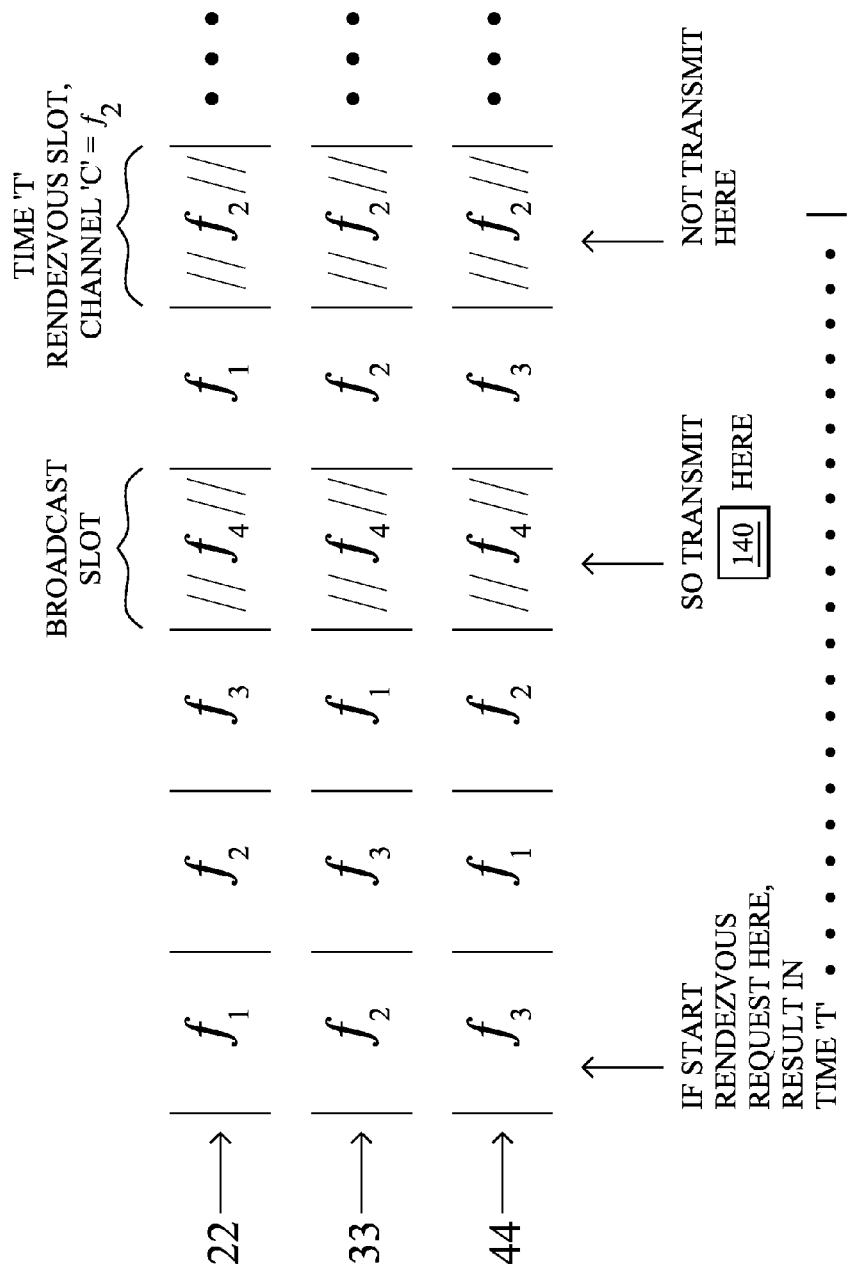
Figure 8C:
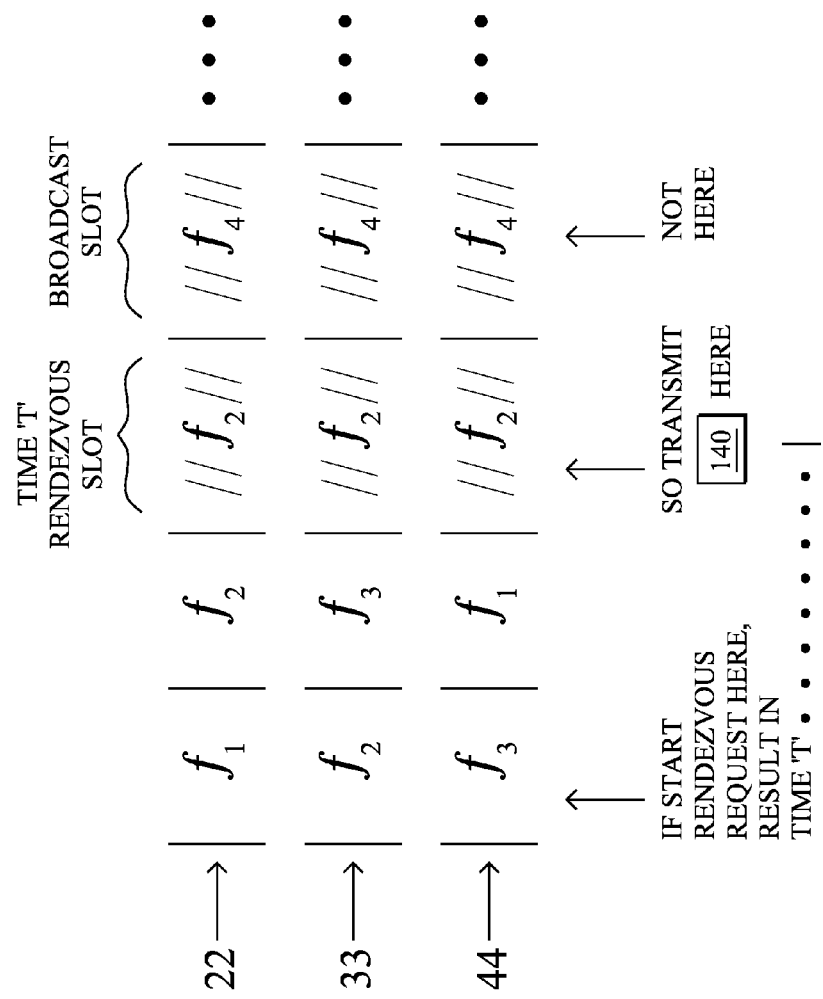

Specifically, when a device has a packet to send to a known set of neighboring devices, such as in the case of multicast message communication with a known set of next-hop destinations, the device may perform the following illustrative sequence of events:

1) Lookup the unicast channel schedule for each receiver.
2) If there is only one receiver, then simply unicast the packet to the receiver using its unicast schedule.
3) Otherwise, build an optimized rendezvous request message transmission sequence based on the unicast channel schedule for each receiver (e.g., as shown above in FIG. 6C). The number of rendezvous request messages in the sequence is bounded by (i) the number of intended receivers and (ii) number of channels used by the system.
3a) If the number of receivers exceeds the number of channels, then only a single rendezvous request message per channel is sufficient to multicast the packet.
3b) If there are overlaps in the channel schedules among the receivers (i.e., more than one receiver listening to the same channel at the same time) then the number of rendezvous request messages may be less than the number of receivers. In other words, as in the optimization described above, a single rendezvous request message transmission may be used to reach multiple receivers simultaneously if they happen to listen to the same channel at the same time.
4) Compare (i) the transmission overhead and expected communication delay (latency) associated with transmitting the rendezvous request message using the optimized sequence to (ii) the transmission overhead and expected communication delay of using a broadcast slot (i.e., waiting for a subsequent broadcast timeslot, if one exists).
5a) If the transmission overhead and/or latency of using the optimized rendezvous request message sequence is too high compared to waiting for the next broadcast slot, then utilize the broadcast slot to transmit the packet and do not use any rendezvous request messages, as shown in FIG. 8B. (In other words, transmit the distributed message during the subsequent broadcast timeslot in response to it being worth waiting for the subsequent broadcast timeslot instead of having the transmission overhead and latency associated with transmitting the rendezvous request message.)
5b) Otherwise, transmit the optimized rendezvous request message sequence followed by the data packet, as shown in FIG. 8C. (In other words, transmit the rendezvous request message and distributed message in response to the transmission overhead and latency associated with transmitting the rendezvous request message being worth not waiting for the subsequent broadcast timeslot.)

Figure 9:
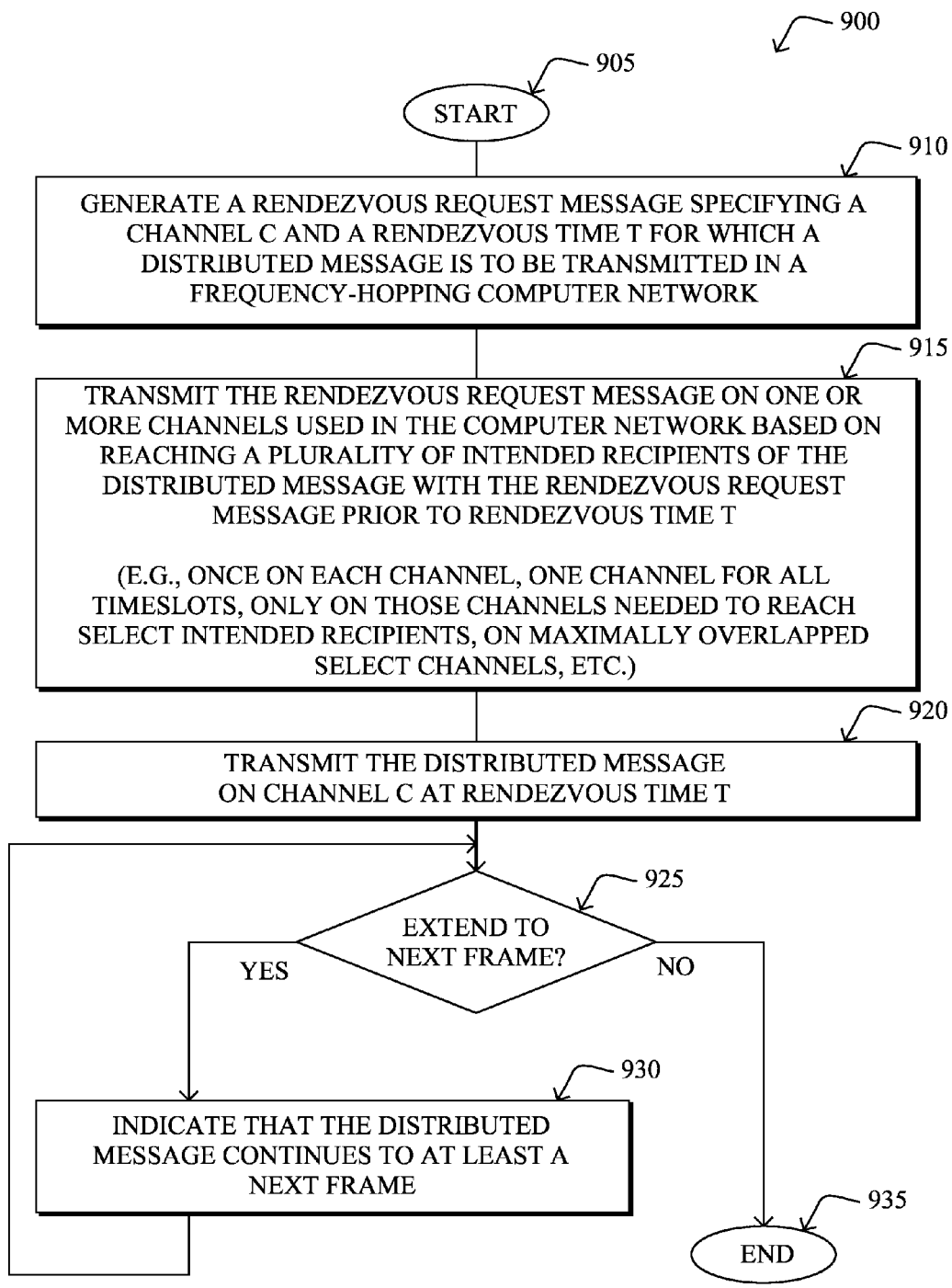
FIG. 9 illustrates an example simplified procedure for efficient transmission of distributed messages (e.g., broadcast/multicast) in a frequency-hopping network in accordance with one or more embodiments described herein, e.g., from the perspective of a transmitting node.

FIG. 9 illustrates an example simplified procedure for efficient transmission of distributed messages (e.g., broadcast/multicast) in a frequency-hopping network in accordance with one or more embodiments described herein, e.g., from the perspective of a transmitting node (e.g., node 11). The procedure 900 starts at step 905, and continues to step 910, where, as described in greater detail above, a rendezvous request message 500 is generated specifying a channel C and a rendezvous time T for which a distributed message 640 is to be transmitted in a frequency-hopping computer network 100. In step 915, the rendezvous request message may then be transmitted on one or more channels used in the computer network based on reaching a plurality of intended recipients of the distributed message with the rendezvous request message prior to rendezvous time T. As mentioned above, the transmission of the rendezvous request message 500 may be according to a number of embodiments, such as, e.g., once on each channel, one channel for all timeslots, only on those channels needed to reach select intended recipients, on maximally overlapped select channels, etc. Also, as mentioned above, there may generally be a dependency on the rendezvous time T and the particular technique for transmitting rendezvous request messages. In particular, some techniques may require more time (e.g. transmitting once per time slot) and require a time T that is further out in the future.

Once the rendezvous time T is reached, then in step 920 the distributed message 640 (e.g., broadcast/multicast) is transmitted on channel C as dictated within the rendezvous request message 500 above. Note that if the distributed message extends into a next frame in step 925, then in step 930 an indication may be included within the message that the distributed message continues to at least a next frame. The procedure 900 ends in step 935 having transmitted the distributed message.

Figure 10:
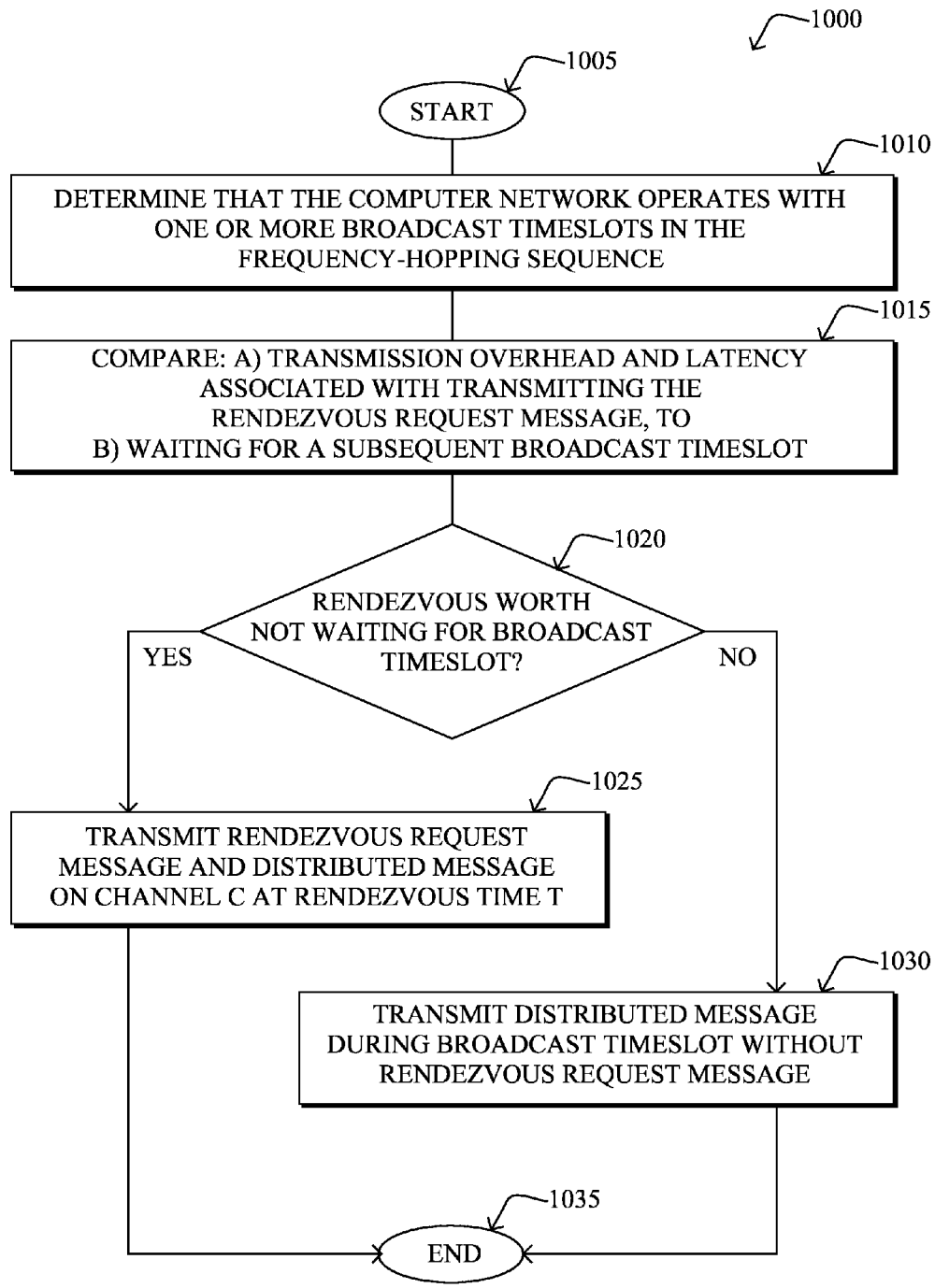
FIG. 10 illustrates an example simplified procedure (sub-procedure) for efficient transmission of distributed messages in a frequency-hopping network in accordance with one or more embodiments described herein, e.g., where the hopping sequence contains broadcast timeslots.

In addition, FIG. 10 illustrates an example simplified procedure (sub-procedure) for efficient transmission of distributed messages in a frequency-hopping network in accordance with one or more embodiments described herein, e.g., where the hopping sequence 300 contains the optional broadcast timeslots as noted above. In particular, the (sub-)procedure 1000 starts at step 1005, and continues to step 1010, where the transmitting device (e.g., node 11) can determine that the computer network 100 operates with one or more broadcast timeslots in the frequency-hopping sequence. In such a situation, in step 1015 the transmitting node can compare: a) transmission overhead and latency associated with transmitting the rendezvous request message, to b) waiting for a subsequent broadcast timeslot, as described in detail above (e.g., with reference to FIGS. 8A-8C). If in step 1020 the process of sending a rendezvous request message (overhead and delay) is worth not waiting for broadcast timeslot (assuming there is a broadcast timeslot), then in step 1025 the node may correspondingly transmit the rendezvous request message 500 and then the distributed message 640 on channel C at rendezvous time T, as noted above (e.g., steps 915 and 920 of FIG. 9). If, on the other hand, it is more worthwhile to wait for the next broadcast timeslot in step 1020, then in step 1030 the node may simply transmit the distributed message during the subsequent broadcast timeslot, i.e., without use of the rendezvous request message. The (sub-)procedure 1000 ends in step 1035.

Figure 11:
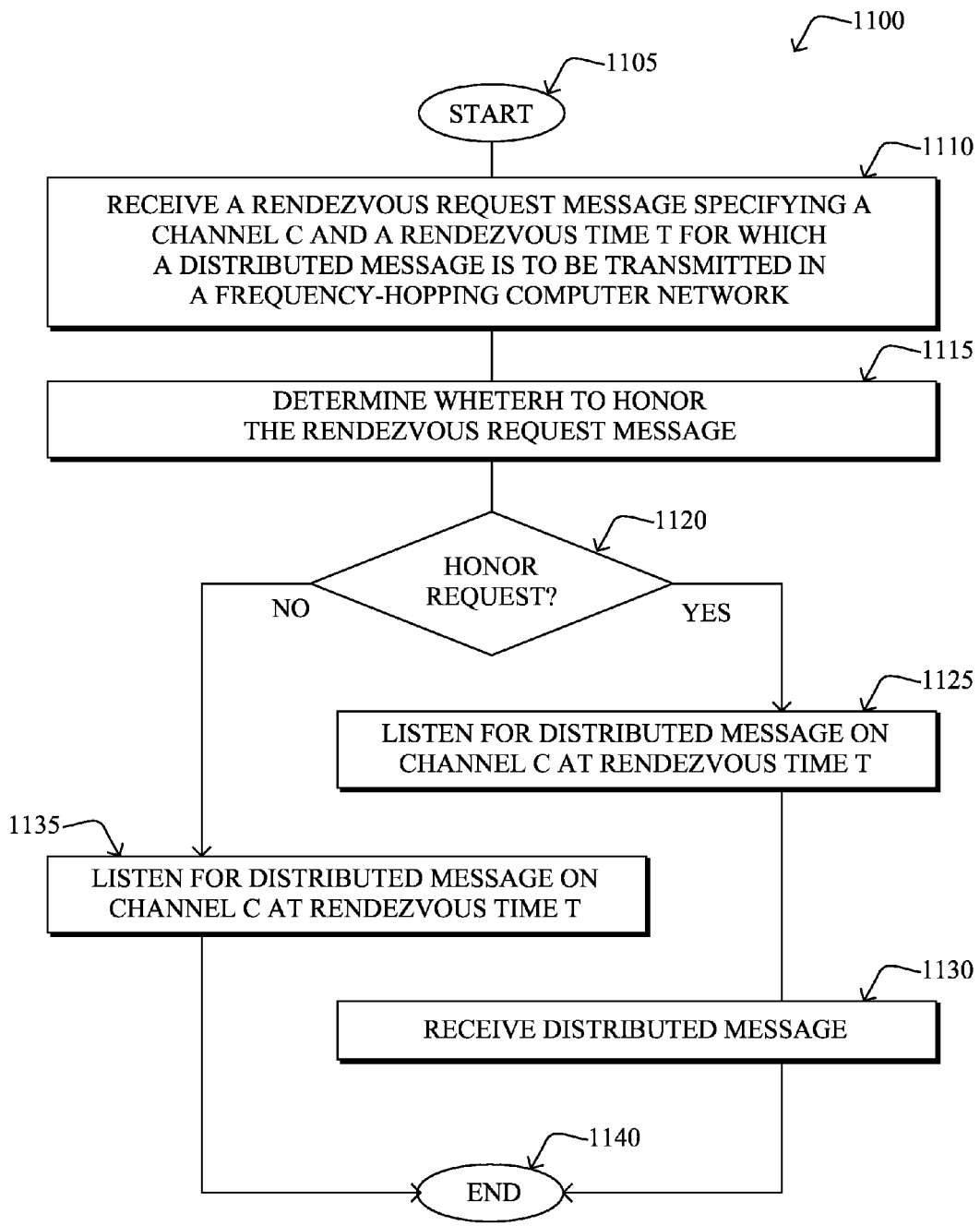
FIG. 11 illustrates an example simplified procedure for efficient transmission of distributed messages in a frequency-hopping network in accordance with one or more embodiments described herein, e.g., from the perspective of a receiving node.

Lastly, FIG. 11 illustrates an example simplified procedure for efficient transmission of distributed messages in a frequency-hopping network in accordance with one or more embodiments described herein, e.g., from the perspective of a receiving node (e.g., nodes 22-44). The procedure 1100 starts at step 1105, and continues to step 1110, where, as described above, the node receives a rendezvous request message 500 specifying a channel C and a rendezvous time T for which a distributed message 640 is to be transmitted in a frequency-hopping computer network 100. In step 1115, the receiving node may, if so configured, determine whether to honor the rendezvous request message. If the decision in step 1120 is to honor the request, then in step 1125 the node may listen for the distributed message on channel C at rendezvous time T, as directed by the received request, receiving the distributed message in step 1130 (presumably, that is, based on packet loss, connectivity changes, etc.). Conversely, if in step 1120 the receiving device decides to not honor the request, such as due to other higher priority tasks/requests, then in step 1135 the receiving device may optionally ensure that it avoids transmission on channel C at rendezvous time T, thus preventing unnecessary contention for the distributed message transmission. The procedure 1100 ends in step 1140.

It should be noted that while certain steps within procedures 900-1100 may be optional as described above, the steps shown in FIG. 9 through FIG. 11 are merely examples for illustration, and certain steps may be included or excluded as desired. Further, while procedures 900-1100 are described separately, certain steps from each procedure may be incorporated into each other procedure, and the two procedures are not meant to be mutually exclusive.

The novel techniques described herein, therefore, provide for efficient transmission of distributed messages (e.g., broadcast/multicast) in a frequency-hopping network. In particular, the techniques above provide an efficient and robust message distribution mechanism in a frequency-hopping network where each transmitter-receiver pair operates using independent channel schedules. By transmitting a rendezvous request message (e.g., RtB control packet) on each necessary channel, neighboring nodes may be told on what channel and time the message will be transmitted. In this manner, the cost of sending a single data message to all neighboring nodes is minimized without requiring accurate network-wide time synchronization, and latency in communicating a message to unknown neighbors is reduced, since there is no need to first discover a channel hopping sequence. In addition, the techniques herein reduce channel-utilization since the control overhead is limited to very short request frames, and increases are made in the effectiveness of network-wide multicast communication where a single message must be delivered to all devices in a network, as well as in the robustness of the network since devices can communicate to one or more neighboring devices using broadcast primitives. Lastly, the techniques herein may improve the lifetime of battery-powered devices, especially edge devices since they do not need to maintain time synchronization when communicating with an attachment router.

Furthermore, specific to particular embodiments described above regarding multicast transmissions, the techniques above reduce communication latency for multicast communication by allowing a device to transmit multicast messages before the next broadcast slot, and avoid utilizing channel capacity dedicated for broadcast communication by transmitting during periods when the broadcast schedule is inactive.

While there have been shown and described illustrative embodiments that provide for efficient transmission of distributed messages in a frequency-hopping network, it is to be understood that various other adaptations and modifications may be made within the spirit and scope of the embodiments herein. For example, the embodiments have been shown and described herein with relation to wireless networks. However, the embodiments in their broader sense are not as limited, and may, in fact, be used with other types of networks and/or protocols, such as PLC (power line communication) or other frequency-hopping (or channel-hopping) mediums. Also, while the description above relates to packetized transmissions, the techniques may be equally applicable to non-packetized transmissions.

Moreover, while the above description generally applies to instances where the sender of the distributed message generates and sends the rendezvous request message, a separate node or device, such as a root node, head-end application, network management service (NMS), etc., may also be configured to distribute the rendezvous request message on the behalf of another device configured to actually transmit the distributed messages.

Note that the IEEE 802.15.4e standard specifies a "wakeup" packet that may include a channel and rendezvous time. According to the standard, however, a batch of continual "wakeup" packets are transmitted in series on the same channel in an attempt to catch a single duty-cycled receiver that is only listening a fraction of the time. After receiving a "wakeup" packet, the receiver ensures that it is on to receive a transmission on the specified channel and time. That is, though the rendezvous request message 500 may be configured similarly to these "wakeup" packets as far as the information they carry is concerned, the use of the rendezvous request message 500 as described herein is distinguished from the use of "wakeup" packets as defined in the protocol.

In particular, the rendezvous request message 500 herein is used to allow efficient distributed message transmissions to a plurality of devices in a frequency-hopping network in a manner that does not require global time synchronization and minimizes channel-utilization, as described above. The "wakeup" packets, on the other hand, are merely designed to "catch" a node that is normally not receiving (e.g., "sleeping") in order to ensure that a message can be received. For instance, a device may have a duty cycle of turning on its receiver once every second for a duration of a millisecond. The "wakeup" packets may then be continually transmitted for at least one second on the single receiver's channel to ensure that at least one of the packets is heard by the duty-cycled receiver, and then the desired message may be sent to that singular receiver when indicated, typically, immediately after the (e.g., one second) series of wakeup packets is sent.

In one specific embodiment, however, it is possible to merge this concept with the techniques described herein. For example, using the same techniques as described in IEEE 802.15.4e to wake up all neighboring "sleepy" nodes together for a broadcast message while each node only samples its channel at that particular wake up window, a sender in accordance with the techniques herein may sends rendezvous request messages across all channels as discussed above, but may repeat the process for one duty cycle (e.g., one second) while each receiver samples long enough to at least catch one rendezvous request message to prepare itself for the distributed multicast message.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
generating a rendezvous request message, the rendezvous request message specifying a channel C and a rendezvous time T for which a distributed message is to be transmitted in a frequency-hopping computer network, and a priority indicating the importance of the distributed message to be transmitted on channel C at time T, wherein the computer network operates with one or more broadcast timeslots in a frequency-hopping sequence;
comparing a) transmission overhead and latency associated with transmitting the rendezvous request message, to b) waiting for a subsequent broadcast timeslot;
determining, based on the comparison, if it is worth waiting for the subsequent broadcast timeslot to transmit the distributed message;
in response to the determining that it is not worth waiting for the subsequent broadcast timeslot,
transmitting the rendezvous request message on one or more channels used in the computer network, the one or more channels based on reaching a plurality of intended recipients of the distributed message with the rendezvous request message prior to rendezvous time T, and
transmitting the distributed message on channel C at rendezvous time T; and
in response to the determining that it is worth waiting for the subsequent broadcast timeslot,
transmitting the distributed message during the subsequent broadcast timeslot.

2. The method as in claim 1, wherein the rendezvous time T is selected from a specified time and a delay until transmitting the distributed message.

3. The method as in claim 1, wherein transmitting the rendezvous request message on the one or more channels comprises transmitting the rendezvous request message once on each channel used in the computer network.

4. The method as in claim 3, wherein transmitting the rendezvous request message once on each channel used in the computer network comprises selecting an order of the channels based on a pseudo-random permutation.

5. The method as in claim 1, further comprising:
determining one or more reachable neighbors from the intended recipients; and
limiting the one or more channels on which the rendezvous request message is transmitted to those channels needed to reach the one or more reachable neighbors.

6. The method as in claim 1, further comprising:
maximizing channel overlap between the intended recipients for transmitting the rendezvous request message.

7. The method as in claim 1, wherein the one or more channels is a single channel transmitted during each timeslot of a frequency-hopping sequence, and wherein each of the intended recipients listens on the single channel at least once during the frequency-hopping sequence.

8. The method as in claim 1, further comprising:
determining that the distributed message extends beyond a single frame; and
in response, indicating within the distributed message transmission that the distributed message continues to at least a next frame.

9. The method as in claim 1, further comprising:
carrier sensing prior to transmitting the rendezvous request message; and
determining the rendezvous time T based on latency expected based on the carrier sensing.

10. The method as in claim 1, wherein the distributed message is a broadcast message to all reachable recipients in the computer network.

11. The method as in claim 1, wherein the distributed message is a multicast message to select intended recipients in the computer network.

12. An apparatus, comprising:
one or more network interfaces to communicate in a frequency-hopping computer network;
a processor coupled to the network interfaces and adapted to execute one or more processes; and
a memory configured to store a process executable by the processor, the process when executed operable to:
generate a rendezvous request message, the rendezvous request message specifying a channel C and a rendezvous time T for which a distributed message is to be transmitted in the frequency-hopping computer network, and a priority indicating the importance of the distributed message to be transmitted on channel C at time T, wherein the computer network operates with one or more broadcast timeslots in a frequency-hopping sequence;
compare a) transmission overhead and latency associated with transmitting the rendezvous request message, to b) waiting for a subsequent broadcast timeslot;
determine, based on the comparison, if it is worth waiting for the subsequent broadcast timeslot to transmit the distributed message;
in response to the determining that it is not worth waiting for the subsequent broadcast timeslot,
transmit the rendezvous request message on one or more channels used in the computer network, the one or more channels based on reaching a plurality of intended recipients of the distributed message with the rendezvous request message prior to rendezvous time T; and
transmit the distributed message on channel C at rendezvous time T; and
in response to the determining that it is worth waiting for the subsequent broadcast timeslot,
transmit the distributed message during the subsequent broadcast timeslot.

13. The apparatus as in claim 12, wherein the rendezvous time T is selected from a specified time and a delay until transmitting the distributed message.

14. The apparatus as in claim 12, wherein the processor when executed to transmit the rendezvous request message on the one or more channels is operable to transmit the rendezvous request message once on each channel used in the computer network.

15. The apparatus as in claim 12, wherein the processor when executed is further operable to:
determine one or more reachable neighbors from the intended recipients; and
limit the one or more channels on which the rendezvous request message is transmitted to those channels needed to reach the one or more reachable neighbors.

16. The apparatus as in claim 12, wherein the processor when executed is further operable to:
maximize channel overlap between the intended recipients for transmitting the rendezvous request message.

17. The apparatus as in claim 12, wherein the one or more channels is a single channel transmitted during each timeslot of a frequency-hopping sequence, and wherein each of the intended recipients listens on the single channel at least once during the frequency-hopping sequence.

18. The apparatus as in claim 12, wherein the distributed message is a broadcast message to all reachable recipients in the computer network.

19. The apparatus as in claim 12, wherein the distributed message is a multicast message to select intended recipients in the computer network.

20. A method, comprising:
receiving a rendezvous request message, the rendezvous request message specifying a channel C and a rendezvous time T for which a distributed message is to be transmitted in a frequency-hopping computer network, and a priority indicating the importance of the distributed message to be transmitted on channel C at time T, wherein the computer network operates with one or more broadcast timeslots in a frequency-hopping sequence;
determining whether to honor the rendezvous request message based upon the priority within the rendezvous request message; and
in response to determining to honor the rendezvous request message, listening for the distributed message on channel C at rendezvous time T,
wherein,
the rendezvous request message and distributed message are received from a transmitter in the network, in response to the transmitter comparing a) transmission overhead and latency associated with transmitting the rendezvous request message to b) waiting for a subsequent broadcast timeslot, and determining, based on the comparison, that it is not worth waiting for the subsequent broadcast timeslot, and
the distributed message is received during the subsequent broadcast timeslot from the transmitter, in response to the transmitter determining, based on the comparison, that it is worth waiting for the subsequent broadcast timeslot.

21. The method as in claim 20, further comprising:
determining to not honor the rendezvous request message in response to a higher priority task at rendezvous time T.

22. The method as in claim 20, further comprising:
determining to not honor the rendezvous request message; and
avoiding transmission on channel C at rendezvous time T.

23. An apparatus, comprising:
one or more network interfaces to communicate in a frequency-hopping computer network;
a processor coupled to the network interfaces and adapted to execute one or more processes; and
a memory configured to store a process executable by the processor, the process when executed operable to:
receive a rendezvous request message, the rendezvous request message specifying a channel C and a rendezvous time T for which a distributed message is to be transmitted in the frequency-hopping computer network, and a priority indicating the importance of the distributed message to be transmitted on channel C at time T, wherein the computer network operates with one or more broadcast timeslots in a frequency-hopping sequence;
determine whether to honor the rendezvous request message based upon the priority within the rendezvous request message; and
listen for the distributed message on channel C at rendezvous time T in response to determining to honor the rendezvous request message,
wherein,
the rendezvous request message and distributed message are received from a transmitter in the network, in response to the transmitter comparing a) transmission overhead and latency associated with transmitting the rendezvous request message to b) waiting for a subsequent broadcast timeslot, and determining, based on the comparison, that it is not worth waiting for the subsequent broadcast timeslot, and
the distributed message is received during the subsequent broadcast timeslot from the transmitter, in response to the transmitter determining, based on the comparison, that it is worth waiting for the subsequent broadcast timeslot.

\* \* \* \* \*